Sept. 23, 1952 R. M. M. OBERMAN 2,611,815

SIGNALING SYSTEM

Filed March 28, 1950 3 Sheets-Sheet 1

*INVENTOR.*
ROELOF MAARTEN MARIE OBERMAN

BY

Michael S. Striker
agt

Sept. 23, 1952 R. M. M. OBERMAN 2,611,815

SIGNALING SYSTEM

Filed March 28, 1950 3 Sheets-Sheet 2

INVENTOR.

ROELOF MAARTEN MARIE OBERMAN

BY

[signature] agt

Sept. 23, 1952 R. M. M. OBERMAN 2,611,815

SIGNALING SYSTEM

Filed March 28, 1950 3 Sheets-Sheet 3

INVENTOR.
ROELOF MAARTEN MARIE OBERMAN
BY
[signature] agt

Patented Sept. 23, 1952 2,611,815

UNITED STATES PATENT OFFICE 2,611,815

SIGNALING SYSTEM

Roelof M. M. Oberman, The Hague, Netherlands

Application March 28, 1950, Serial No. 152,451
In the Netherlands July 26, 1941

Section 1, Public Law 690, August 8, 1946
Patent expires July 26, 1961

4 Claims. (Cl. 178—2)

Figure 1:
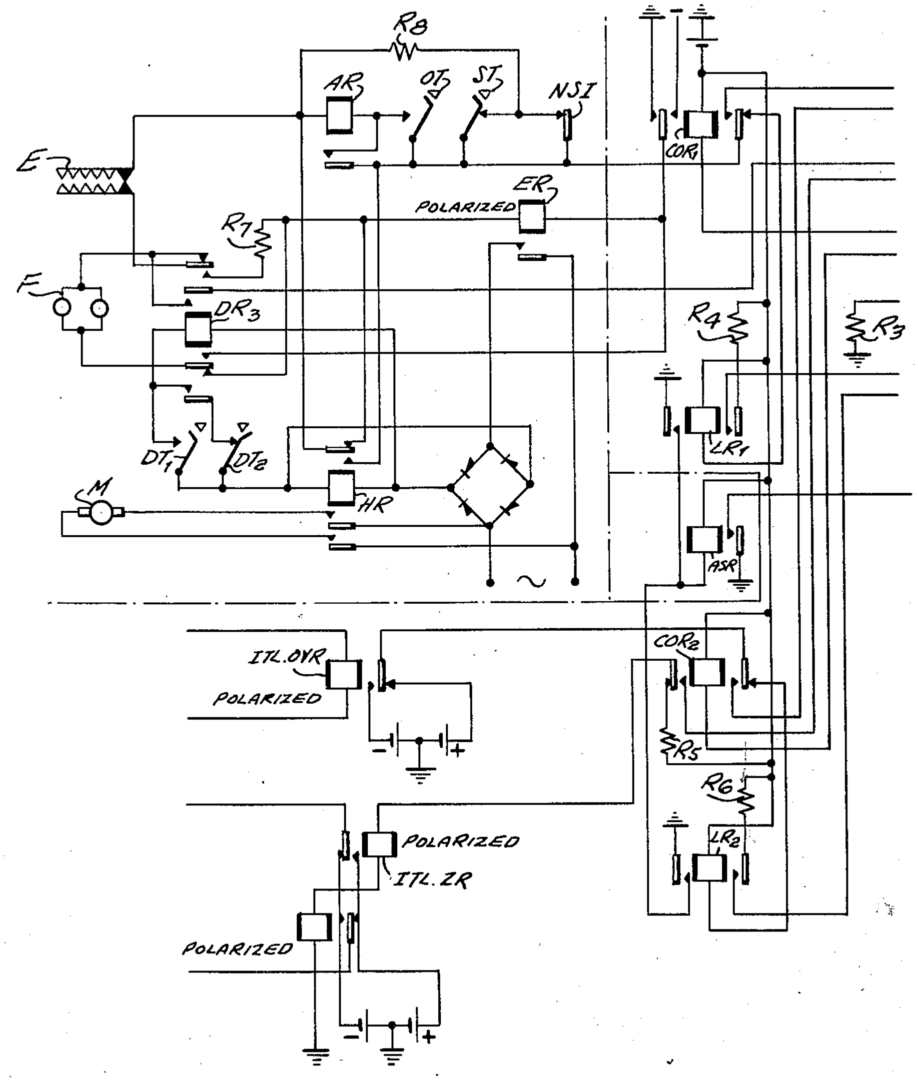

The present invention relates to signalling systems, in particular for telegraph transmission, in which a number of subscribers may be connected to an exchange by double current or single current lines, these subscribers being interconnected in the exchange manually or automatically by means of a repeater which adapts itself automatically to the number nature of the incoming and outgoing lines in a manner not resulting in signal distortion or limitation in speed of operation.

This application is a continuation-in-part of my copending application Serial No. 777,139, filed October 1, 1947.

In known exchange systems for establishing interconnections between telegraph subscriber lines of different nature, the subscriber lines each terminate in a fixed repeater in the exchange, these repeaters working on the side of the subscriber with current of different nature and on the side of the connecting link with current of one and the same nature, e. g. double current, so as to obtain a system, in which interconnections of arbitrary subscriber lines may be established by one and the same connecting link, without means for adapting this link to the nature of the subscriber lines.

In U. S. Patent 1,959,412 a bidirectional telegraph exchange system is described, in which the lines do not terminate in a fixed repeater. Only one repeater is added in the connecting link, serving to interconnect the lines. As the repeater does not adapt itself to the nature of the incoming and outgoing lines, the application of this system is limited to exchanges interconnecting lines of identical nature.

It is the main object of this invention to provide an exchange system, in which adaptable repeaters are added in the connecting links between lines, these repeaters being connected to the lines only when required. As the subscribers do not terminate each in a fixed repeater consisting of polarized relays, the number of repeaters required may be reduced, whereby an important economy is obtained.

In consequence means are provided in the connecting link for discriminating the nature of the incoming and outgoing line, and for adapting the circuit of the repeater to these lines, which may be single current two- and four-wire lines and double current lines.

In making a connection to a single current subscriber line, it is necessary to adapt the receiving relay to the line. This adaptation is achieved in the system according to the invention by prolonging all the single current lines behind the local receiving relay by means of stationary, individual compensating resistances, which have the resistance of the subscriber loop.

The repeaters of the invention are so arranged that incoming and outgoing connections of different nature may be interconnected at will. It will be clear from the description, that the repeater is not only suitable to the mutual adaptation of subscriber lines, belonging to a single exchange but also to the interconnection of arbitrary connections to and from other exchanges.

A further object of the invention is to provide local subscriber arrangements, which are suitable for both simplex and duplex traffic, at the subscriber's desire. For subscribers, using the arrangements of the invention, a possibility exists to increase the economy of a line used in mutual traffic by simultaneous transmission and reception over two wire pairs, if no copy of their emission is required or if they make use of an automatic transmitter. Subscribers, not requiring this facility are connected to the exchange by a single wire pair.

The replacement according to the invention of stationary terminating apparatus for each subscriber connection as heretofore used in telegraph exchanges by repeaters in the connecting links, only inserted when necessary, opens up the possibility of testing these links without any subscribers.

The invention will now be described in an example for an automatic register exchange. The system of the invention may however also be applied to manual exchanges or to direct system exchanges or to other types of semi- or full-automatic exchanges. The accompanying drawings show the system of the invention only in so far as is required for properly understanding the invention.

In the drawings—

Figure 2:
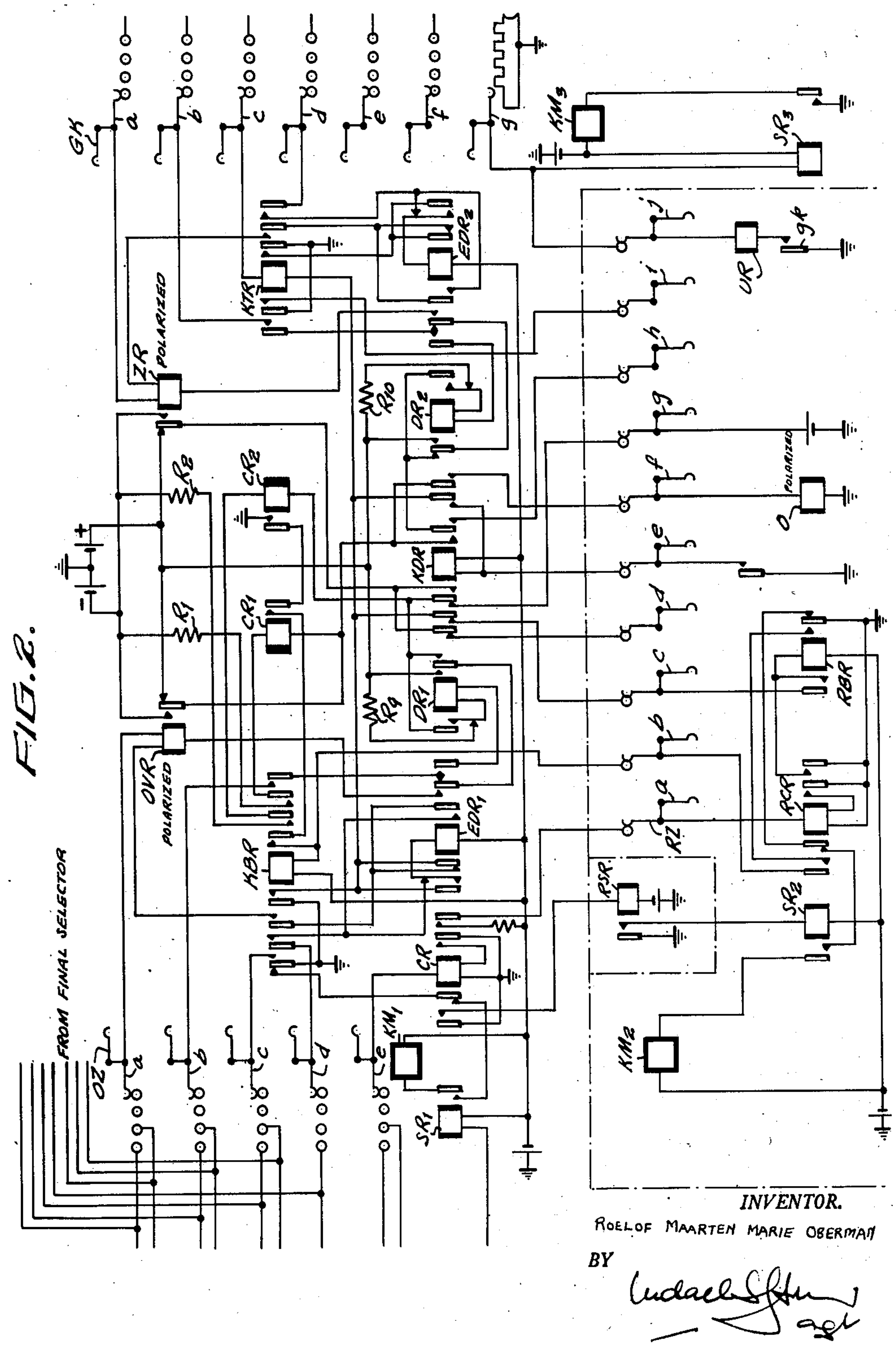
Figures 3, 4, 5:
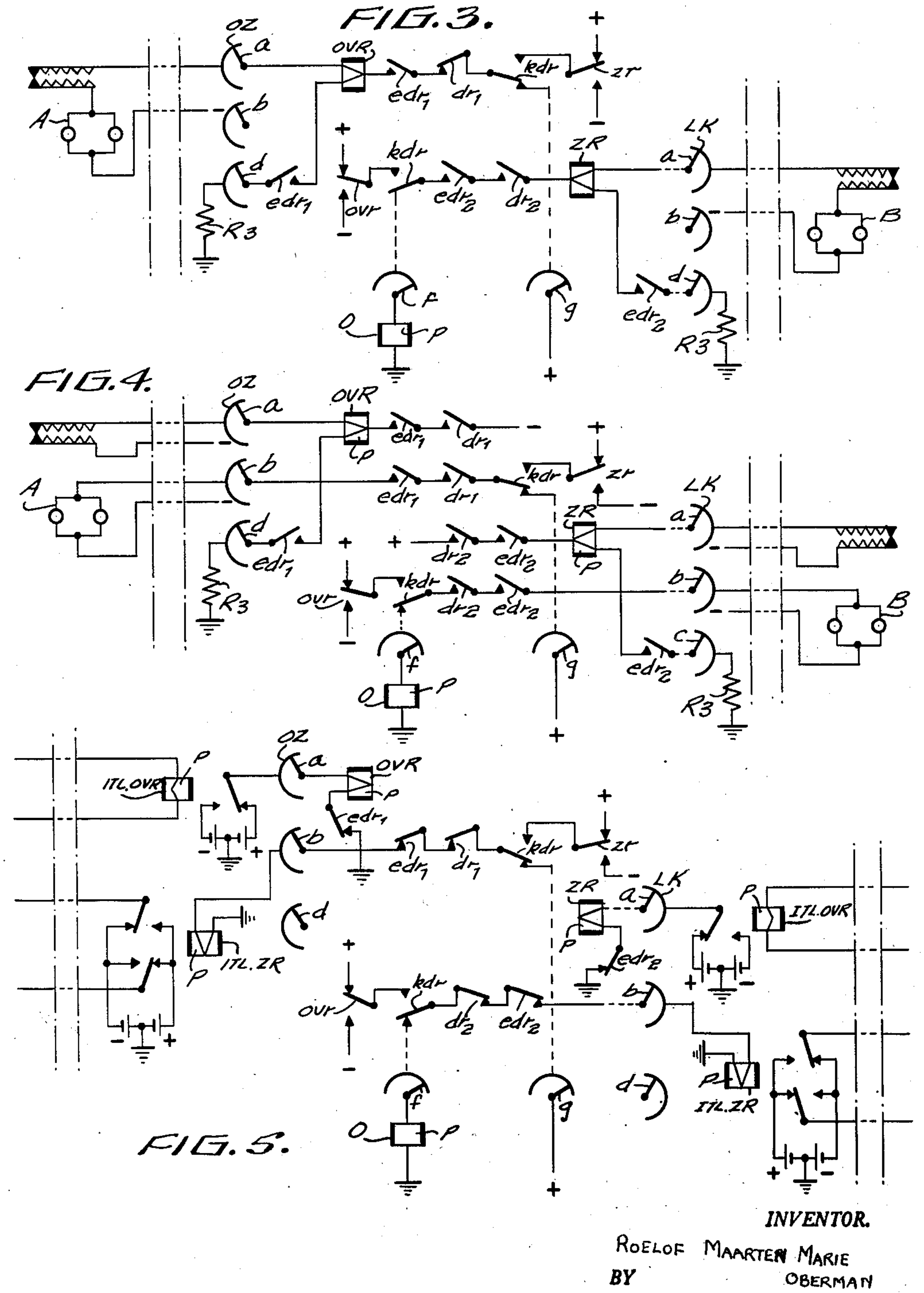

Fig. 1 is a wiring diagram of the local circuit of a subscriber and part of the exchange according to the invention;

Fig. 2 which is a right hand continuation of Fig. 1, shows a connecting link according to the invention; and Figs. 3–5 are wiring diagrams of the various positions of the repeater circuits shown in Fig. 2.

Referring now to the drawings and first to Fig. 1, the circuit of a local subscriber set is shown in the upper part which is provided with the arrangement according to the invention for working simplex and duplex. This subscriber is connected to the exchange by two pairs of wires. In the lower part of Fig. 1 the repeater is shown having a double current line, which may be the connection to the exchange of a district subscriber or of another exchange. Furthermore an apparatus is shown individual to the subscribers, and serving to terminate the lines, which apparatus consists of the line and cut off relays and, for the single current lines, of the compensating resistance adapting the telegraph relays in the adaptable repeater to these lines.

Fig. 2 shows the main parts of the connecting link with the adaptable repeater, in which polarized relays OVR and ZR are the local receiving and transmitting relays, respectively.

In connection with the repeater circuit a call finder OZ, and the first selecting stage comprising a group selector GK are shown, while in the lower part of the figure the register is shown with its connections to a register finder RZ, only as far as is required for the explanation of the invention. The relays $EDR_1$ and $EDR_2$ discriminate the incoming and outgoing junction lines, respectively, in single current and double current lines and adapt the corresponding parts of the repeater to the kind of current used on these lines.

Operation of relays $DR_1$ and $DR_2$ adapts the repeater to duplex-single current traffic; such operation may be effected at will by the subscribers. The functions of the other relays will be clear from the following description:

Figs. 3, 4 and 5 show the different repeater circuits, which may be established by the action of the discriminating relays in the connecting links. All unimportant details have been omitted for the sake of clarity. The parts in the connecting link, more properly belonging to the repeater are shown, namely the local receiving relay OVR and the local transmitting relay ZR. The make contacts of the discriminating relays $EDR_1$, $EDR_2$, $DR_1$ and $DR_2$, forming part of the circuits, are shown in open position, while the cut-off contacts are shown in closed position.

In Fig. 3 the repeater is shown in the position required for the interconnection of two local simplex subscribers. In Fig. 4 the repeater is shown in the position interconnecting two single current duplex subscribers.

Fig. 5 shows the circuit of the repeater for the interconnection of two double current lines, which are terminated by individual repeaters in the exchange.

In Figs. 3 to 5 inclusive the through connections from the calling subscriber to the register, which are switched off after the connection between the subscriber is established, are shown in dotted lines.

It will be clear from these drawings, that all other combinations of incoming and outgoing lines of different kind may also be interconnected by the adaptable repeater.

The adaptation of the repeater, which in normal condition is switched for double current lines, to a calling single current subscriber will now be described. In normal condition of the subscriber's set in Fig. 1, a circuit is closed from − battery, over the winding of line relay $LR_1$, the back contact of the right-hand change-over contact of the cut-off relay $COR_1$, dial contact $NS_1$, resistance $R_8$, back contact of the upper change-over contact of relay HR, the winding of polar relay ER, the back contact of the left-hand change-over contact of relay $COR_1$ to ground. In this condition, owing to the resistance $R_8$, the current in the circuit amounts to about 5 mA., the line relay $LR_1$ being safely kept at normal by a current of 5 mA.

Furthermore the current direction is such, that the polarized relay ER keeps its contact opened as shown, so that the printer motor M is stopped. On pressing the calling key OT resistance $R_8$ is bridged by relay AR. The current in the subscriber's loop now increases so much, that the operation of the relays $LR_1$ in the exchange and AR in the subscriber's set is accomplished. Relay AR bridges with its front contact the calling key OT, which thus has only momentarily to be operated.

At the operation of the line relay $LR_1$, in consequence of an incoming call, the call finders, allotted to the call are started. In Fig. 2 a free call finder OZ with a repeater is shown; the local subscriber is connected to the first contacts in the rows of contacts of the call finder. The right-hand front contact of line relay $LR_1$ applies negative test voltage over a resistance $R_4$ to the first contact of contact row *e* in all the call finders of this group.

At the receipt of a starting mark in one of the line relays, common starting relay ASR is operated in a circuit from − battery, its own winding, the left-hand front contact of relay $LR_1$ to ground.

The front contact of relay ASR closes in its turn operating circuits for the starting relays $SR_1$ of all appropriate call finders. The driving magnets of the call finders are now energized, the front contacts of relays $SR_1$ close circuits similar to that shown in the drawing from − battery, the winding of driving magnet $KM_1$, a make contact of starting relay $SR_1$, cut-off contacts of test relay CR and cord seizure relay KBR to ground. Call finder OZ and the other free call finders are permitted to start.

If call finder OZ of Fig. 2 is the first to reach the calling subscriber line, the test relay CR is energized in a circuit from battery, resistance $R_4$, a make contact of relay $LR_1$ in Fig. 1, wiper *e* of call finder OZ and the high resistance winding of relay CR to ground. At the operation of relay CR, its make contact applies ground to the low resistance winding of relay CR, whereby the current increases so much, that the negative test voltage at the contacts in the *e*-rows of all call finders becomes insufficient for the operation of other test relays CR. In this manner double tests in this stage of building up the connection are prevented.

In a way analogous to the seizure of a free call finder, a number of register finders are started, one of which connects the calling subscriber to a free register. On the operation of test relay CR ground is applied to a common register starting relay RSR, which closes with its front contact circuits for the starting relays $SR_2$ of a number of appropriate register finders. Fig. 2 shows a free register finder RZ. Relay $SR_2$ applies ground to the driving magnet $KM_2$ of the register finder over the right hand back contact of relay RBR, the left hand back contact of relay RCR and its own make contact. If the register finder RZ arrives first of all at the contacts of the calling connecting link, test voltage is applied to the high resistance winding of relay RCR by means of the contact in the row *a* of the register finder. On the operation of relay RCR the register finder stops and the low resistance winding of relay RCR is connected to ground, in order to prevent double tests.

As the register test relay RCR is energized at the moment when a free register is found, operating circuits are closed for two holding relays, namely for the register holding relay RBR, which remains operated during the holding time of the register in a circuit from −battery, the winding of relay RBR and a right hand make contact of relay RCR to ground, and for the cord holding relay KBR a circuit from −battery, the winding of relay KBR, the *b*-wiper of the register finder RZ, a make contact of relay RCR and the make side of the change-over contact of relay RBR to ground. Relay KBR which has a controlling function in the connecting circuit and in the register, holds itself after the connections to the register are switched off, in a circuit over its own make contacts and the make contacts of the slow releasing guarding relays $CR_1$ and $CR_2$, these relays being operated in a manner, which will be described hereinafter.

The operating of the cord seizure relay KBR has some consequences, which have an extraordinary significance in the system according to the invention. First relay $COR_1$ operates in a circuit from −battery, the winding of relay $COR_1$, the *c*-wiper of the call finder OZ and the make side of the change-over contact of relay KBR to ground, whereby the relays $LR_1$, CR and RCR are released. Negative test voltage is no longer applied to the contacts of the *e*-row of call finder OZ so that effective protection against double tests is provided.

Furthermore circuits for the relays, discriminating the kind of calling line, are closed in a manner now to be described. The *d* contacts in the call finder OZ, belonging to incoming single current subscriber lines, are connected to ground over an individual compensating resistance $R_3$, shown in Fig. 1. In contra-distinction thereto, the *d*-contacts belonging to incoming double current lines, are not connected.

If the *d*-wiper encounters ground, in case a single current subscriber is calling, relay $EDR_1$ operates in a circuit from −battery, winding of relay $EDR_1$, the back side of its make-before-break contact, a make contact of relay KBR, call finder wiper *d* and the local compensating resistance $R_3$ to ground. Thereafter relay $EDR_1$ holds itself over the make side of its own make-before-break contact and a make contact of relay KBR. As the magnetization of relay $EDR_1$ is precluded, if the *d*-wiper of the call finder does not find a way to ground, the operated state of discriminating relay $EDR_1$ thus forms the criterion for the connecting circuit, having been seized from the caller's side by a single current line.

By the magnetization of relay $EDR_1$, if a single current line is connected, the windings of the local receiving relay OVR are switched in as shown in Fig. 3. The extremities are connected, respectively, to the line, over the *a*-wiper of call finder OZ, and to ground over the *d*-wiper and the individual compensating resistance $R_3$. The junction of the windings of relay OVR is connected to + pole of the battery in the register, over a make contact of relay $EDR_1$, cut-off contacts of relays $DR_1$ and KDR and the *g*-wiper of the register finder RZ.

In consequence of the fact, that at the operation of relay $COR_1$, the tongue of the right-hand contact of this relay is moved over from −battery in the exchange to +battery in the register, and the left-hand tongue from ground to −telegraph battery, the current direction in the polarized relay ER is inverted so that it closes its contact. Rectified voltage is therefore supplied to relay HR, which closes both its lower front contacts, whereby the subscriber printer motor is started, this being also the criterion for the subscriber to commence selection. From this moment the subscribers, provided with the arrangement of Fig. 1, may also adapt their apparatus for duplex-traffic.

The installation of a subscriber enabling him to work simplex or duplex, as required, comprises a relay $DR_3$ or switch, establishing in the simplex position a circuit with the transmitting contacts E and the receiving magnet F of the teleprinter in series as termination of the one pair of wires, the other pair remaining unconnected. In the duplex position the transmitting loop with transmitting contacts E and the receiving loop with the receiving magnet F are separated, the corresponding pairs of wires respectively terminating in the local receiving relay OVR and the tongue of the local transmitting relay ZR in the exchange. The transmitting loop may contain an automatic keyer.

Fig. 1 shows an example of such a subscriber installation. If the duplex condition is wanted, relay $DR_3$ is operated by pushing a key $DT_1$. The subscriber set is connected in simplex line condition when relay $DR_3$ is in normal position, and is connected, in the duplex line condition when relay $DR_3$ is operated.

Relay $DR_3$ closes a holding circuit for itself by its lower make contact maintaining the circuit after the release of key $DT_1$. On the operation of the duplex relay $DR_3$ the receiving magnet F of the teleprinter is switched in a circuit over the *b*-wiper of the call finder OZ in series with the relay $DR_1$ in the connecting link: +telegraph battery, resistance $R_9$, winding $DR_1$, make contacts of the relays $EDR_1$ and KBR, *b*-wiper of call finder OZ, upper make contact of relay $DR_3$, receiving magnet F, make side of left-hand change-over contact of relay $COR_1$, −telegraph battery. As relay $DR_1$ operates, it closes a holding circuit for itself by means of the make side of its make-before-break contact and is inserted in series between +battery in the register and the line connected to the *b*-wiper of the call finder OZ.

Now a repeater circuit is established as shown in Fig. 4. The extremities of the windings of relay OVR are connected in the same manner as disclosed for simplex-condition. However, the junction of the windings is connected to telegraph battery over a make contact of relay $DR_1$.

By pushing key $DT_2$ the subscriber may again interrupt the operating circuit for relay $DR_3$, whereby this relay and relay $DR_1$ in the connecting line are released and the connection of the repeater toward the caller becomes again simplex.

As the calling subscriber is now connected to the register in a manner easily to be understood from Figs. 3 and 4, he may transmit the series of selecting impulses by means of the dial NSI, shown in Fig. 1, to the receiving relay O in the register. After the recording of the number by the register, the line to another exchange or to another subscriber on the same exchange is obtained, dependent on the recorded number, if this line is found free. This selection, which may be done in a manner known from the usual register exchange systems, is shown in principle in Fig. 2 for the group-selector GK. From the moment when the contact *gk* is closed by the register, the starting relay $SR_3$ is operated in a circuit over the *j*-wiper of the register finder. Relay $SR_3$ closes its front contact and the driving magnet $KM_3$ of the group-selector GK is energized. Every step, made by the group-selector GK, results in an evident manner in a de-energization of the relay UR in the register, the number of steps being controlled by the register. When group-selector GK has made a number of steps, which corresponds to the number, recorded in the register, contact *gk* is opened and relay $SR_3$ and driving magnet $KM_3$ release their armatures.

If the called subscriber is free, the corresponding cut-off relay $COR_1$ will be in normal condition, and is operated in a circuit from —battery, the winding of the corresponding relay $COR_1$, a connecting wire to the corresponding contact in the row C of the final selector, the *c*-wipers of the group-selectors, the winding of relay KTR in the connecting link, and a make contact of relay KBR to ground. Relay KTR is thus operated after which the relays $EDR_2$ and $DR_2$ adapt the right hand part of the circuit to the kind of outgoing connection, in an analogous manner as already described for the relays $EDR_1$ and $DR_1$. If the called line is a single current line, relay $EDR_2$ is operated, as ground is supplied to the corresponding contact in the row *d* of the final selector; owing to the operation of relay $EDR_2$ a circuit is established for relay $DR_2$ over the *b*-wiper of the final selector, if wanted by the called subscriber. The circuits for local transmitting relay ZR established by these switchings are similar to those for local receiving relay OVR and are shown in Figs. 3 and 4. The printer motor of the called subscriber is started by the inversion of the current direction in the subscriber loop as a result of the operation of corresponding relay $COR_1$. The register action may then be terminated by the switching through relay KDR to which ground is applied at this moment by an action of the register over wiper *e* of the register finder RZ. For simplex the junctions of the windings of one local receiving relay OVR and one local transmitting relay ZR are through-connected one to the tongue of the other. For duplex the tongues of these relays are connected to the receiving coils of the subscribers. From this moment the identification combination of the called subscriber may be transmitted, so that this subscriber may now transmit his name and number toward the caller as a signal, that the connection is established.

During the several actions described, circuits are established for the two supervisory relays $CR_1$ and $CR_2$. By the action of relay $EDR_1$ the junction of the windings of the local receiving relay OVR is connected to +battery in the register over a make contact of relay $EDR_1$ and a cut-off contact of relay $DR_1$. (Fig. 3.) The currents in the left and right hand winding are now such, that the tongue of relay OVR is moved over to + side of telegraph battery, if it was not already against this side. Relay $CR_1$ is now energized in a circuit from —telegraph battery, resistance $R_1$, a make contact of relay KBR, winding of relay $CR_1$, spacing side of the tongue of local receiving relay OVR to +telegraph battery. Relay $CR_2$ operates likewise in a circuit from —telegraph battery, resistance $R_2$, make contact of relay KBR, windings of relay $CR_2$, cut-off contact of relay KDR, *g*-wiper of register finder RZ to +battery in the register.

The function of the relays $CR_1$ and $CR_2$ is to establish a holding circuit for the cord seizure relay KBR, which circuit may be interrupted by these relays when desired by the subscribers. Relay $CR_1$ supervises the connection toward the calling subscriber, relay $CR_2$ supervises the connection toward the called subscriber. The caller, as well as the called subscriber, are able to interrupt the connection by pushing the release key ST of Fig. 1 for some moments, e. g. 200 milliseconds. This key interrupts, when pushed down by the calling subscriber, the loop terminated by the local receiving relay OVR, and when pushed down by the called subscriber, the loop terminated by the local transmitting relay ZR. As a consequence the tongues *ovr*, or *zr*, respectively, of the relays OVR or ZR, move over to —battery for a time which is long enough to release the slowly actuated relays $CR_1$ or $CR_2$. The breaking of the holding circuit of relay KBR restores the link to free condition. Relays $CR_1$ and $CR_2$ must be slow releasing relays, since they are not to release, when during the spacing elements of the repeated telegraph signals the tongues of the relays OVR and ZR are brought against —battery.

If the connection is not yet fully completed, the caller may stop the building up of the connection by pushing the release key ST, causing relay $CR_1$ to be released, whereas the register may release the connection by demagnetizing relay $CR_2$, if the called subscriber is found busy. The word "busy" may be transmitted to the caller by the register, before the release occurs.

From the foregoing description of the adaptation of the repeater to a single current line and the building up of the connection between subscribers, it will be clear that the repeater is in normal position suitable for the interconnection of double current lines, as relays $EDR_1$, $EDR_2$, $DR_1$ and $DR_2$ are in non-operated position.

As described hereinbefore the contacts in the *d*-row of the call finders OZ are not connected to ground for double current-lines. Thus, after the operation of the cord seizure relay KBR no ground is applied to the relay $EDR_1$, this relay remaining now not operated. As the operating circuit for relay $DR_1$ contains a make contact of relay $EDR_1$, relay $DR_1$ does not operate either. Fig. 5 shows the repeater circuit, that is established in this case. The windings of the local receiving relay OVR are switched in series between the tongue of the trunk receiving relay ITL.OVR and ground, over a cut-off contact of relay $EDR_1$. The junction of the windings remains unconnected, owing to an open make contact of relay $EDR_1$. The trunk transmitting relay ITL.ZR is, over the *b*-wiper and cut-off contacts of relays $EDR_1$ and $DR_1$, connected to the tongue of relay ZR when relay KDR is energized by the register. The called side of the repeater may be adapted to the kind of the called line in a way similar to that described for a single current line, or to that described now for a double current line.

Furthermore, a free register may be seized in the same manner as by a local subscriber by a district subscriber or by another exchange, the junction lines of which to the exchange are double current lines. In normal condition the armature of the trunk receiving relay ITL.OVR is against — pole of battery. At an incoming subscriber's call, which is characterized in the emission of + voltage on the trunk line by the subscriber, the tongue is moved toward + pole of battery, and line relay $DR_2$ is energized in a circuit from +telegraph battery, over the tongue of relay ITL.OVR, the back contact of the upper change-over contact of relay $COR_2$, and the windings of relay $LR_2$ to —battery. The consecutive switchings, resulting in the seizure of a free connecting link and a free register, follow in the same manner as described for a single current subscriber.

As soon as the relay KBR operates, ground is applied to the left hand winding of relay OVR, and the tongue of this relay moves over to the + side of telegraph battery, as marking current is sent by the calling subscriber. Thus the operating circuits for slow releasing supervising relays $CR_1$ and $CR_2$ are established.

It is observed, that subscribers connected to the exchange over double current lines have also a possibility to work duplex with the arrangement of the invention. These subscribers are connected over a local single current line to a repeater, inverting the single current signals to double current signals over the interlocal double current line to the exchange. The trunk junction lines are suitable for duplex-traffic. The adaptation of the subscriber set to the four wire traffic, which has only consequences on the single current part of this connection to the exchange, has no influence on the condition of the trunk junction line and the repeater in the connecting link of the automatic exchange.

I claim:

1. A telegraph system comprising in combination, a plurality of stations including at least one station having a single current line and at least one station having a double current line; a repeater; means for connecting said stations to said repeater one at a time; a receiving relay in said repeater receiving telegraph signals emitted by said one of said stations connected to said repeater, said receiving relay having a first winding and a second winding connected in series to each other; a discriminatory relay in said repeater; means for energizing said discriminatory relay when one of said stations having a single current line is connected to said repeater, said discriminatory relay remaining de-energized when one of said stations having a double current line is connected to said repeater; a grounded resistor; a first contact controlled by said discriminatory relay and connected to the junction of said windings of said receiving relay, said first contact being closed upon energization of said discriminatory relay and connecting the junction of said windings to battery voltage; and a second contact controlled by said discriminatory relay and connected to the end of said first winding different from the junction of said windings, said second contact connecting said first winding to said grounded resistor when said discriminatory relay is energized, and directly to ground when said discriminatory relay is de-energized.

2. A telegraph system comprising in combination, a plurality of stations including at least one station having a single current line and at least one station having a double current line; means for changing at least one of said stations having a single current line from simplex to duplex and vice versa; a repeater; means for connecting said stations to said repeater one at a time; a receiving relay in said repeater receiving telegraph signals emitted by said one of said stations connected to said repeater, said receiving relay having a first winding and a second winding connected in series to each other; a first discriminatory relay in said repeater; means for energizing said first discriminatory relay when one of said stations having a single current line is connected to said repeater, said first discriminatory relay remaining de-energized when one of said stations having a double current line is connected to said repeater; a second discriminatory relay in said repeater; means for energizing said second discriminatory relay when one of said stations having a single current line is connected to said repeater and changed from simplex to duplex; a grounded resistor; a first contact controlled by said first discriminatory relay and connected to the junction of said windings of said receiving relay; a contact controlled by said second discriminatory relay and connected in series to said first contact of said first discriminatory relay, said first contact being closed upon energization of said first discriminatory relay and connecting the junction of said windings to said contact of said second discriminatory relay, said contact of said second discriminatory relay having two positions in which the same is connected with one terminal and the other terminal, respectively, of battery; and a second contact controlled by said first discriminatory relay and connected to the end of said first winding different from the junction of said windings, said second contact connecting said first winding to said grounded resistor when said first discriminatory relay is energized, and directly to ground when said first discriminatory relay is de-energized.

3. A telegraph system comprising in combination, a cord finder switch having a first bank of contacts, a first wiper cooperating therewith, a second bank of contacts, a second wiper cooperating therewith, a third bank of contacts, and a third wiper cooperating therewith; a plurality of stations including at least one station having a single current line and at least one station having a double current line; means for converting said one station having a single current line from simplex to duplex and vice versa; a plurality of transmitting contacts and a receiving magnet forming part of said one station having a single current line, said plurality of transmitting contacts and said receiving magnet being connected in series to each other when said one station having a single current line is operating in simplex; means for connecting one terminal of said plurality of transmitting contacts to a contact of said first contact bank of said cord finder switch; means forming part of said converting means and removing the series connection of said plurality of transmitting contacts and said receiving magnet and connecting the same to a contact of said second contact bank of said cord finder switch; means for connecting the lines of said station having a double current line, respectively, to other contacts of said first and second contact banks of said cord finder switch; a receiving relay in said repeater receiving telegraph signals emitted by any of said stations connected to said repeater over said cord finder switch, said receiving relay having two windings connected in series to each other, one of said windings of said receiving relay being connected to said first wiper of said cord finder switch; a first discriminatory relay in said repeater; means for energizing said first discriminatory relay when one of said stations having a single current line is connected to said repeater, said first discriminatory relay remaining de-energized when one of said stations having a double current line is connected to said repeater; a second discriminatory relay in said repeater; means for energizing said second discriminatory relay when one of said stations having a single current line is connected to said repeater and changed from simplex to duplex; a grounded resistor connected to a contact of said third contact bank of said cord finder switch, said contact of said third contact bank being brushed by said third wiper simultaneously with the brushing by said first and second wipers, respectively, of said contacts of said first and second contact banks connected to the terminals of said station having a single current line; a first contact controlled by said first discriminatory relay and connected to the junction of said windings of said receiving relay; a contact controlled by said second discriminatory relay connected in series to said first contact of said first discriminatory relay, said first contact being closed upon energization of said first discriminatory relay and connecting the junction of said windings to said contact of said second discriminatory relay, said contact of said second discriminatory relay having two positions in which the same is connected with one terminal and the other terminal, respectively, of battery; and a second contact controlled by said first discriminatory relay and connected to the end of the other of said windings of said receiving relay, said second contact connecting said other winding to said third wiper of said cord finder switch when said first discriminatory relay is energized and directly to ground when said first discriminatory relay is de-energized, whereby when a station having a simplex single current line is connected to said repeater said first discriminatory relay is energized and said second discriminatory relay is de-energized and said other winding of said receiving relay is connected to ground over said resistor, when a station having a duplex single current line is connected to said repeater both said discriminatory relays are energized and said other winding of said receiving relay is connected to ground over said resistor, and when a station having a double current line is connected to said repeater neither of said discriminatory relays is energized and said other winding of said receiving relay is directly connected to ground.

4. A telegraph system comprising in combination, a cord finder switch having a first bank of contacts, a first wiper cooperating therewith, a second bank of contacts, a second wiper cooperating therewith, a third bank of contacts, and a third wiper cooperating therewith; a plurality of stations including at least one station having a single current line and at least one station having a double current line; means for converting said one station having a single current line from simplex to duplex and vice versa; a plurality of transmitting contacts and a receiving magnet forming part of said one station having a single current line, said plurality of transmitting contacts and said receiving magnet being connected in series to each other when said one station having a single current line is operating in simplex; means for connecting one terminal of said plurality of transmitting contacts to a contact of said first contact bank of said cord finder switch; means forming part of said converting means and removing the series connection of said plurality of transmitting contacts and said receiving magnet and connecting the same to a contact of said second contact bank of said cord finder switch; means for connecting the lines of said station having a double current line, respectively, to other contacts of said first and second contact banks of said cord finder switch; a receiving relay in said repeater receiving telegraph signals emitted by any of said stations connected to said repeater over said cord finder switch, said receiving relay having two windings connected in series to each other, one of said windings of said receiving relay being connected to said first wiper of said cord finder switch; a first discriminatory relay in said repeater; means for energizing said first discriminatory relay when one of said stations having a single current line is connected to said repeater, said first discriminatory relay remaining de-energized when one of said stations having a double current line is connected to said repeater; a second discriminatory relay in said repeater, said second discriminatory relay being connected in series to a contact closed by the energization of said first discriminatory relay; means for energizing said second discriminatory relay when one of said stations having a single current line is connected to said repeater and changed from simplex to duplex; a grounded resistor connected to a contact of said third contact bank of said cord finder switch, said contact of said third contact bank being brushed by said third wiper simultaneously with the brushing by said first and second wipers, respectively, of said contacts of said first and second contact banks connected to the terminals of said station having a single current line; a first contact controlled by said first discriminatory relay and connected to the junction of said windings of said receiving relay; a contact controlled by said second discriminatory relay connected in series to said first contact of said first discriminatory relay, said first contact being closed upon energization of said first discriminatory relay and connecting the junction of said windings to said contact of said second discriminatory relay, said contact of said second discriminatory relay having two positions in which the same is connected with one terminal and the other terminal, respectively, of battery; and a second contact controlled by said first discriminatory relay and connected to the end of the other of said windings of said receiving relay, said second contact connecting said other winding to said third wiper of said cord finder switch when said first discriminatory relay is energized and directly to ground when said first discriminatory relay is de-energized, whereby when a station having a simplex single current line is connected to said repeater said first discriminatory relay is energized and said second discriminatory relay is de-energized and said other winding of said receiving relay is connected to ground over said resistor, when a station having a duplex single current line is connected to said repeater both said discriminatory relays are energized and said other winding of said receiving relay is connected to ground over said resistor, and when a station having a double current line is connected to said repeater neither of said discriminatory relays is energized and said other winding of said receiving relay is directly connected to ground.

ROELOF M. M. OBERMAN.

REFERENCES CITED

The following references are of record in the file of this patent:

FOREIGN PATENTS

| Number | Country | Date |
|---|---|---|
| 531,902 | Great Britain | Jan. 14, 1941 |